United States Patent
Xiao

(10) Patent No.: US 8,253,072 B2
(45) Date of Patent: Aug. 28, 2012

(54) DATA INPUT DEVICE

(75) Inventor: Yun-Shan Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 993 days.

(21) Appl. No.: 12/211,821

(22) Filed: Sep. 17, 2008

(65) Prior Publication Data

US 2010/0032422 A1 Feb. 11, 2010

(30) Foreign Application Priority Data

Aug. 8, 2008 (CN) .......................... 2008 1 0303617

(51) Int. Cl.
*H05B 1/00* (2006.01)
*H05B 1/02* (2006.01)

(52) U.S. Cl. ........................................ 219/209; 219/494

(58) Field of Classification Search .................. 219/209, 219/482, 489–494, 501, 502, 538, 539, 548; 345/163

See application file for complete search history.

(56) References Cited

U.S. PATENT DOCUMENTS

| | | | | |
|---|---|---|---|---|
| 3,139,575 A | * | 6/1964 | Brown | 363/89 |
| 3,385,957 A | * | 5/1968 | Munson et al. | 219/501 |
| 3,858,027 A | * | 12/1974 | Phillips | 219/203 |
| 4,091,266 A | * | 5/1978 | Ito et al. | 219/504 |
| 4,167,688 A | * | 9/1979 | Burek et al. | 315/178 |
| 5,128,521 A | * | 7/1992 | Lanno et al. | 219/518 |
| 6,060,698 A | * | 5/2000 | Petrides et al. | 219/492 |
| 6,646,226 B1 | * | 11/2003 | Reitz | 219/209 |
| 6,650,522 B2 | | 11/2003 | Horibata et al. | |
| 6,894,254 B2 | | 5/2005 | Hauschulz | |
| 2007/0216646 A1 | * | 9/2007 | Sun | 345/163 |

FOREIGN PATENT DOCUMENTS

| | | |
|---|---|---|
| CN | 2615749 Y | 5/2004 |
| TW | 508608 | 11/2002 |
| TW | 554161 | 9/2003 |
| TW | 200736963 A | 10/2007 |

OTHER PUBLICATIONS

"Temperature controller for electric fan", Feng Wang, Family Doctor, 2002, p. 22, Issue 3, China.

* cited by examiner

*Primary Examiner* — Sang Paik
(74) *Attorney, Agent, or Firm* — Altis Law Group, Inc.

(57) ABSTRACT

A data input device includes a heating circuit and a temperature control circuit. The heating circuit includes a heating apparatus, and a relay. When a temperature of the data input device is lower than a determined temperature, a first switch of the data input device is turned off, and a relay of the data input device is turned on, and the heating apparatus heats at least one surface of the data input device.

16 Claims, 4 Drawing Sheets

DATA INPUT DEVICE

BACKGROUND

1. Technical Field

The present disclosure relates to data input devices, and particularly to a data input device with a heating function.

2. Description of the Related Art

Data input devices such as a mouse and a stylus are commonly used with computers. However, it is uncomfortable for people to use such input devices for a long time in a cold environment.

DETAILED DESCRIPTION

Figure 1:
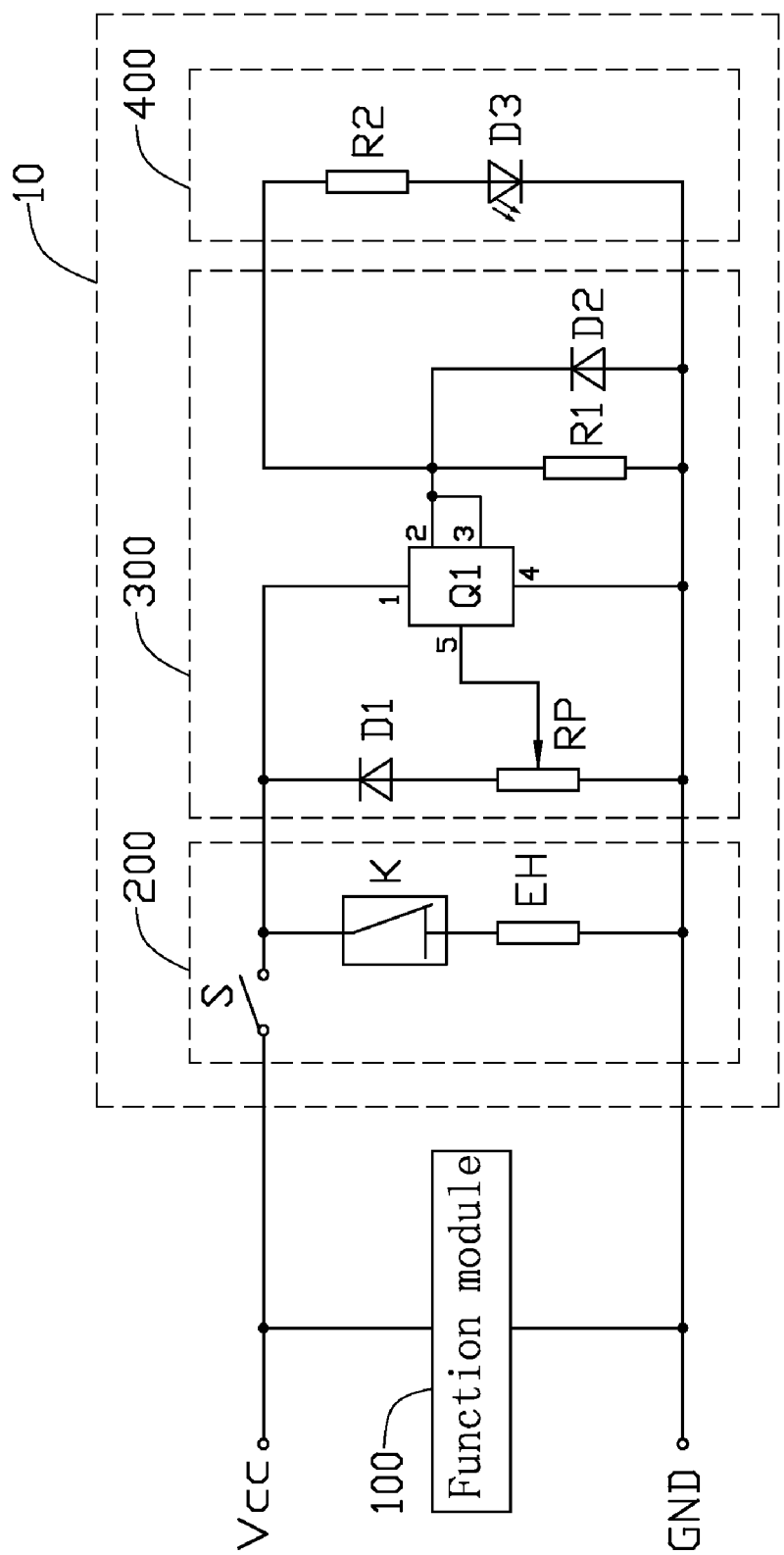
FIG. 1 is a circuit diagram of a data input device in accordance with one embodiment of the present disclosure.

Referring to FIG. 1, one embodiment of a data input device 10 includes a heating circuit 200, a temperature control circuit 300, and an indication circuit 400. The data input device 10 may be connected to a function module 100. The function module 100 is configured for processing the input of the data input device 10. One end of the function module 100 is connected to a 5V power line VCC. The other end of the function module 100 is connected to a ground line GND. The data input device 10 may be used to heat at least one surface of an electronic device, such as a mouse, a stylus, and a game controller as will be explained in greater detail below.

The heating circuit 200 includes a switch S, a direct current (DC) relay K, and an electric heater EH. One end of the switch S, functioning as a first terminal of the heating circuit 200, is connected the 5V power line VCC. The other end of the switch S is connected to one end of the DC relay K and, functioning as a second terminal of the heating circuit 200, is also connected to the temperature control circuit 300. The other end of the DC relay K is connected to the ground line GND via the electric heater EH.

The temperature control circuit 300 includes a diode D1, a variable resistor RP, a electronic switch Q1, a resistor R1, and a diode D2. A cathode of the diode D1, functioning as a first terminal of the temperature control circuit 300, is connected to the second terminal of the heating circuit 300 and also connected to a power pin 1 of the electronic switch Q1. An anode of the diode D1 is connected to one fixed end of the variable resistor RP. The other fixed end of the variable resistor RP is connected to the ground line GND. A sliding end of the variable resistor RP is connected to a control pin 5 of the electronic switch Q1. Two input/output (I/O) pins 2, 3 of the electronic switch Q1 are connected to the ground line GND via the resistor R1. A ground pin 4 of the electronic switch Q1 is connected to the ground line GND. A cathode of the diode D2 is connected to the I/O pin 2 of the electronic switch Q1. An anode of the diode D2 is grounded. The I/O pin 2 of the electronic switch Q1, functioning as a second terminal of the temperature control circuit 300, is also connected to the indication circuit 400.

The indication circuit 400 includes a resistor R2 and a light-emitting diode (LED) D3. The anode of the LED D3 is connected to the second terminal of the temperature control circuit 300 via the resistor R2. The cathode of the LED D3 is connected to the ground line GND.

In one embodiment, the diode D1 is a germanium diode, and the diode D2 is a silicon rectifier diode. The electronic switch Q1 is a TWH877 integrated circuit (IC) chip, in one embodiment. Users can determine the temperature of the data input device 10 by regulating the variable resistor RP.

When it is desired to heat the data input device, the switch S is closed to connect the DC relay K to the 5V power line VCC. When the temperature of the data input device 10 is low, a reverse resistance of the diode D1 will be high such the voltage at a control pin 5 of the electronic switch Q1 will be lower than the bias voltage of the electronic switch Q1, thus the electronic switch Q1 is off. The bias voltage required for the electronic switch Q1 is controlled by setting of the variable resistor RP. The DC relay K is closed to activate the electronic heater EH. The reverse resistance of the diode D1 reduces as the temperature of the data input device 10 increases, thereby the voltage at the control pin 5 of the electronic switch Q1 increases.

When the temperature of the data input device 10 reaches a pre-determined temperature, the voltage at pin 5 will have increased enough to activate the electronic switch Q1, which results in the power pin 1 connecting to the I/O pins 2, 3 of the element switch Q1, which causes a portion of the current in the circuit to used by the resistor R1 and the diode D2, thus reducing the amount of current through the DC relay K, at which point the DC relay K opens to shut off the electronic heater EH. Optionally the indicator circuit 400 may be included. When Q1 turns off thus shutting off the electronic heater EH, the LED D3 emits light to indicate that the temperature of the data input device has reached the pre-determined temperature.

When it is not desired to heat the data input device 10, the switch S is opened to disconnect the DC relay K from the 5V power line VCC. The switch S can be mounted on an outside surface of the data input device 10.

Figure 2A:
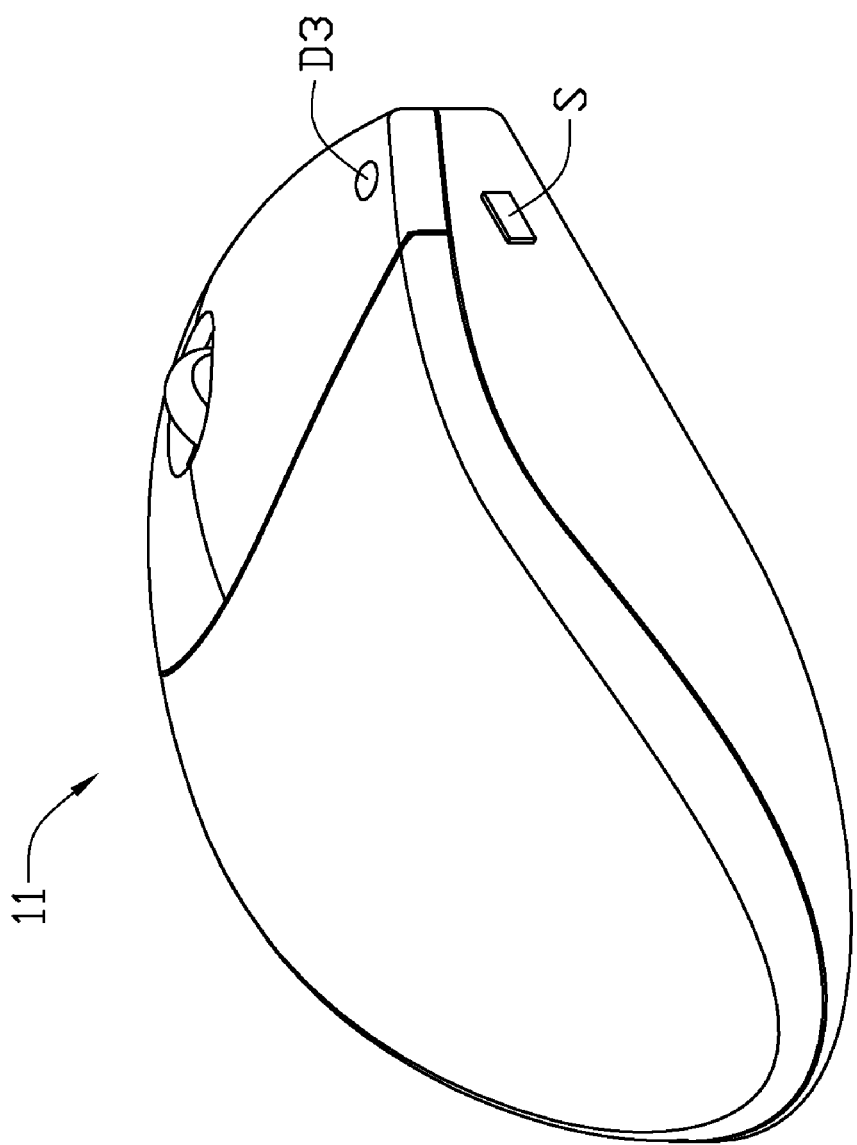
FIG. 2A is a mouse employing the circuit of FIG. 1.
Figure 2B:
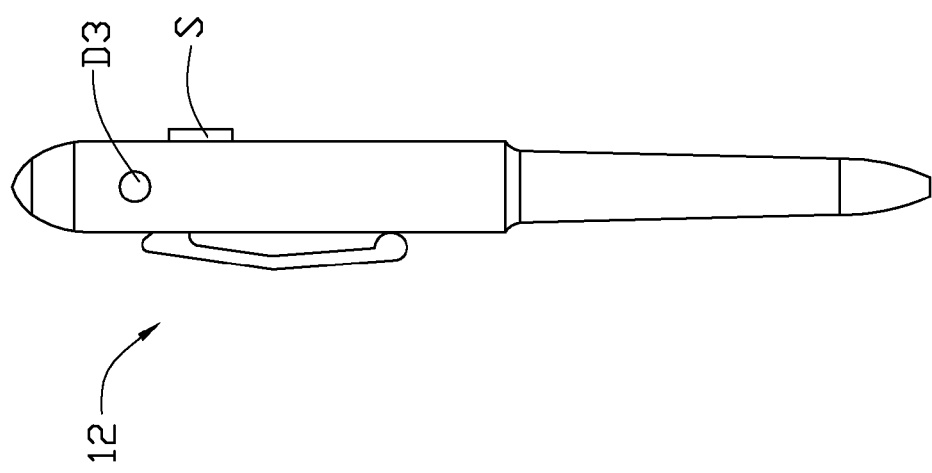
FIG. 2B is a stylus employing the circuit of FIG. 1.
Figure 2C:
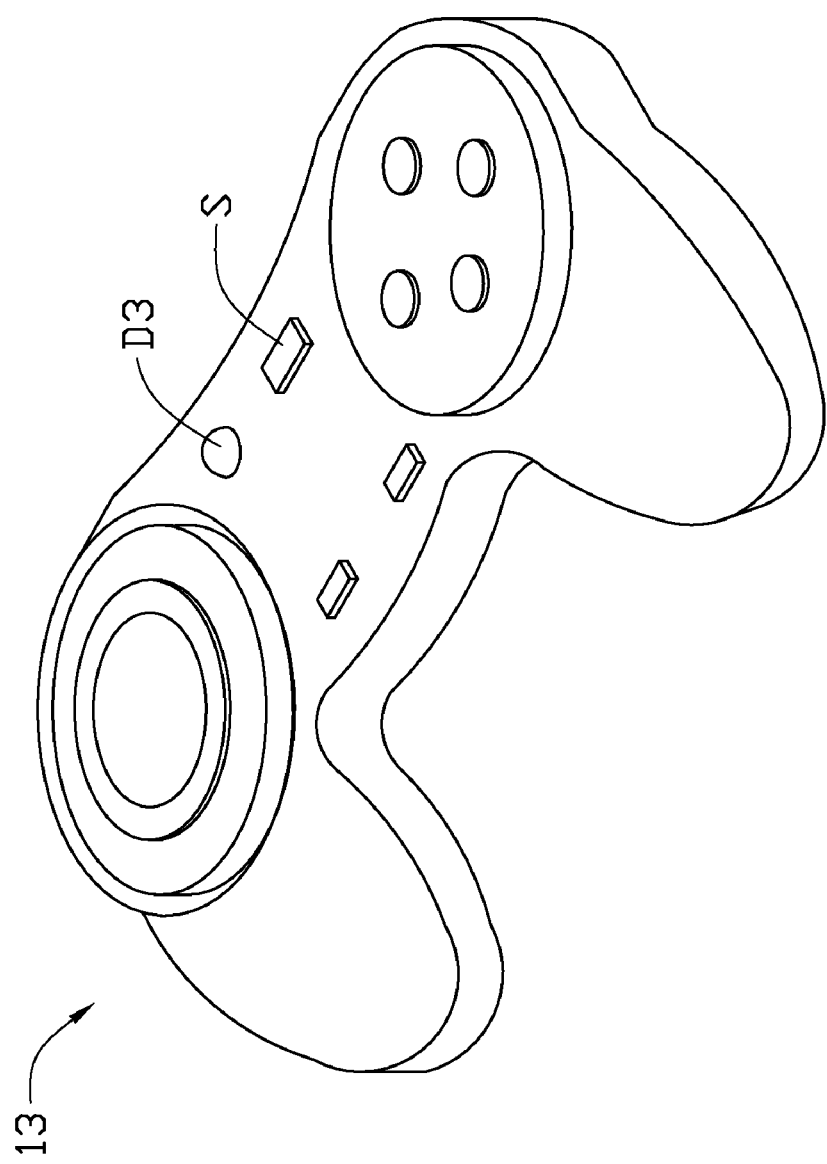
FIG. 2C is a game controller employing the circuit of FIG. 1.

Referring to FIG. 2A, FIG. 2B and FIG. 2C, the data input device 10 can be a mouse 11, a stylus 12, or a game controller 13.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A data input device for heating at least one surface of the data input device, the data input device comprising:

a heating circuit comprising:
  a heating apparatus; and
  a relay comprising:
    a first terminal connected to a power supply; and
    a second terminal grounded via the heating apparatus; and a temperature control circuit comprising:
  a variable resistor comprising a first fixed end, a second fixed end grounded, and a sliding end, wherein a determined temperature of the data input device is set through adjusting the variable resistor;
  a second resistor;
  a first diode comprising:
    a cathode connected to the first terminal of the relay; and an anode connected to the first fixed end of the variable resistor; and an integrated circuit chip comprising:
a power pin connected to the cathode of the first diode;
a control pin connected to the sliding end of the variable resistor;
at least one input/output (I/O) pin grounded via the second resistor; and
a ground pin grounded;

wherein upon the condition that a temperature of the data input device is lower than the determined temperature, a reverse resistance of the first diode is high such that a voltage at the control pin of the integrated circuit chip is lower than a bias voltage of the integrated circuit chip, thus the integrated circuit chip is turned off, the relay is closed to activate the heating apparatus; the reverse resistance of the first diode reduces as the temperature of the data input device increases, thereby the voltage at the control pin of the integrated circuit chip increases;

wherein upon the condition that the temperature of the data input device reaches the determined temperature, the voltage at the control pin of the integrated circuit chip exceeds the bias voltage to activate the integrated circuit chip, resulting in the power pin connected to the at least one I/O pins of the integrated circuit chip, which causes a part of current from the power supply to pass through the second resistor, thus reducing the amount of current through the relay, at which point the relay opens to shut off the heating apparatus.

2. The data input device as claimed in claim 1, wherein the data input device is a mouse.

3. The data input device as claimed in claim 1, wherein the data input device is a stylus.

4. The data input device as claimed in claim 1, wherein the data input device is a game controller.

5. The data input device as claimed in claim 1, wherein the data input device is connected to a function module which is configured for processing input of the data input device.

6. The data input device as claimed in claim 1, wherein the first diode is a germanium diode.

7. The data input device as claimed in claim 1, wherein the temperature control circuit further comprises a second diode, a cathode of the second diode is connected to the at least one I/O pin of the first switch, and an anode of the second diode is grounded.

8. The data input device as claimed in claim 7, wherein the second diode is a silicon rectifier diode.

9. The data input device as claimed in claim 1, wherein the integrated circuit chip comprises two I/O pins connected to each other.

10. The data input device as claimed in claim 1, wherein the heating circuit further comprises a second switch, the first terminal of the relay is connected to the power supply via the second switch.

11. The data input device as claimed in claim 10, wherein the second switch is mounted on a surface of the data input device.

12. The data input device as claimed in claim 1, wherein the voltage of the power supply is 5V.

13. The data input device as claimed in claim 1, wherein the heating apparatus is an electronic heater.

14. The data input device as claimed in claim 1, wherein the relay is a direct current relay.

15. The data input device as claimed in claim 1, wherein the data input device further comprises an indication circuit, the indication circuit is connected to the at least one I/O pin of the integrated circuit chip, wherein when the integrated circuit chip is turned on, the indication circuit indicates that the temperature of the data input device has reached the determined temperature.

16. The data input device as claimed in claim 15, wherein the indication circuit comprises a third resistor and a lighting-emitting diode (LED), an anode of the LED is connected to the at least one I/O pin of the integrated circuit chip, and a cathode of the LED is grounded.

* * * * *